United States Patent [19]

Finch

[11] Patent Number: 5,632,098
[45] Date of Patent: May 27, 1997

[54] BEAN ROASTING SYSTEM

[76] Inventor: Timothy S. Finch, 11167 Wood Elves Way, Columbia, Md. 21044

[21] Appl. No.: 628,005

[22] Filed: Apr. 4, 1996

[51] Int. Cl.⁶ ............................................. F26B 17/00
[52] U.S. Cl. ........................................ 34/63; 99/421 H
[58] Field of Search ............................... 34/63, 68, 95, 34/109, 126, 547, 602, 603, 166; 99/421 H, 286, 323.5

[56] References Cited

U.S. PATENT DOCUMENTS

| | | | |
|---|---|---|---|
| 1,747,239 | 2/1930 | Hauck | 34/126 |
| 2,101,417 | 12/1937 | Waldvogel | 34/63 |
| 2,705,450 | 4/1955 | Steinbook | 99/421 H |
| 3,103,161 | 9/1963 | Whitehead | 99/421 H |
| 4,061,083 | 12/1977 | Caliva | 99/421 H |
| 4,484,064 | 11/1984 | Murray | 219/400 |
| 4,543,907 | 10/1985 | Fowler | 118/19 |
| 4,691,447 | 9/1987 | Nakai et al. | 34/68 X |
| 4,860,461 | 8/1989 | Tamaki et al. | 34/68 |
| 4,924,765 | 5/1990 | Pera | 34/63 X |
| 4,979,439 | 12/1990 | Ferron-Zepeda | 99/421 H X |
| 5,016,362 | 5/1991 | Nakamura et al. | 34/63 X |
| 5,193,444 | 3/1993 | Bar-Sheshet | 99/427 |
| 5,287,633 | 2/1994 | Sachs | 34/392 |
| 5,361,686 | 11/1994 | Koopman | 99/421 H |

*Primary Examiner*—John M. Sollecito
*Assistant Examiner*—Steve Gravini
*Attorney, Agent, or Firm*—Morton J. Rosenberg; David I. Klein

[57] ABSTRACT

A bean roasting system (10) is provided for use on a barbecue grill (12). The system includes a housing member (22) generally formed as a cylindrical tubular member, formed from a metallic composition with a mesh or plurality of openings which will allow convective heat to pass within the housing member (22). The system includes a rotational mechanism (36) for rotating the housing member (22) about its longitudinal axis. The rotational mechanism includes a motor mechanism (44) coupled to an axially directed rod (48) which extends through and is coupled to housing member (22) for causing housing member (22) to rotate about its longitudinal axis. First and second bracket members (70 and 72), respectively, releasably coupled to opposing end walls of barbecue grill (12), rotatively support axially directed rod (48) so as to permit housing (22) to rotate over barbecue grill (12). Housing member (22) includes a removable closure mechanism (52) for permitting the addition or removal of coffee beans from housing (22).

10 Claims, 2 Drawing Sheets

BEAN ROASTING SYSTEM

BACKGROUND OF THE INVENTION

1. Field of the Invention

This invention is directed to a system for roasting coffee beans and, more particularly, to a system for roasting coffee beans over a barbecue grill.

2. Prior Art

Bean roasting systems are known in the art. In particular, the closest related art known to Applicant includes U.S. Pat. Nos. 4,860,461; 5,287,633; and, 4,484,064, which are generally directed to coffee bean roasting systems. Additional related art includes U.S. Pat. Nos. 4,543,907; 5,361,686; 4,979,439; 4,924,765; 4,691,447; 5,016,362; and, 5,193,444.

None of the related art bean roasting systems teach a device adapted in construction for roasting beans in conjunction with a barbecue grill. In the coffee bean roasting device of U.S. Pat. 4,860,461, issued to Tamaki, et al., a bean roasting system is contained within an insulated housing containing infrared heaters for roasting beans. This prior art system employs a complicated method of loading and unloading coffee beans using feed vanes and return vanes, and, because the roasting drum 12 is enclosed within an insulated body 2, such is not adaptable to use with a barbecue system.

Similarly, in the coffee beans roasting process and apparatus of U.S. Pat. No. 5,287,633, issued to Sachs, a closed system for roasting beans is taught wherein heat from a furnace is pumped into an outer vessel which contains an inner vessel, the inner vessel being adapted to hold beans for roasting. Because of the closed nature of the prior art system, a ventilation system is necessary in order to exhaust fumes from the roasting system.

In the coffee bean roasting device of U.S. Pat. No. 4,484,064, a bean roasting system akin to a forced hot air pop-corn popper is taught. None of these related art devices, however, teach a coffee bean roasting system for use on a barbecue grill with the concatenation of mounting elements and bean roasting housings necessary for use with standard a barbecue grill.

SUMMARY OF THE INVENTION

It is an object of the invention to provide a bean roasting system for use on a barbecue grill.

It is another object of the invention to provide a bean roasting system for use on a barbecue grill which is inexpensive to manufacture, easy to use and simple to maintain.

It is yet another object of the invention to provide a means for mounting a bean roasting device over a barbecue.

It is yet another object of the invention to provide a barbecue grill system having a bean roasting system mounted thereon.

In order to accomplish these and other objectives, the bean roasting system of the invention includes a housing adapted to be rotatively supported over any conventional type of barbecue grill. The conventional barbecue will contain hot coals or gas burners for providing necessary heat for roasting beans contained within the housing, and will, in a preferred embodiment, have a housing mounting mechanism releasably attached to opposing sidewalls of the grill. The housing mounting mechanism will rotatively support the bean housing and, in addition, will support a rotational mechanism for rotating the housing member about a longitudinal axis over the barbecue grill. The housing mechanism will be formed of a sheet-like metal having perforations therethrough preferably in a mesh-like pattern, permitting the convective heat from the barbecue grill to pass through the housing wall and into contact with the beans contained therein. As the heat from the grill roasts the coffee beans contained in the rotating housing, an agitation mechanism within the housing will distribute the beans within the housing so as to insure even roasting of all sides of the total surface of the beans, thus insuring a thorough and even roasting of the beans.

In overall view, the present invention concept directs itself to a bean roasting system mounted over a barbecue grill which includes a housing extending in a longitudinal direction with the housing having opposing first and second ends. A mechanism for rotating the housing is provided which is coupled to the housing and is located above the barbecue grill. Additionally, a removable closure is coupled to the second end of the housing for capturing the beans within the housing when the housing is rotatively displaced about a longitudinal axis.

DESCRIPTION OF THE PREFERRED EMBODIMENTS

Figure 1:
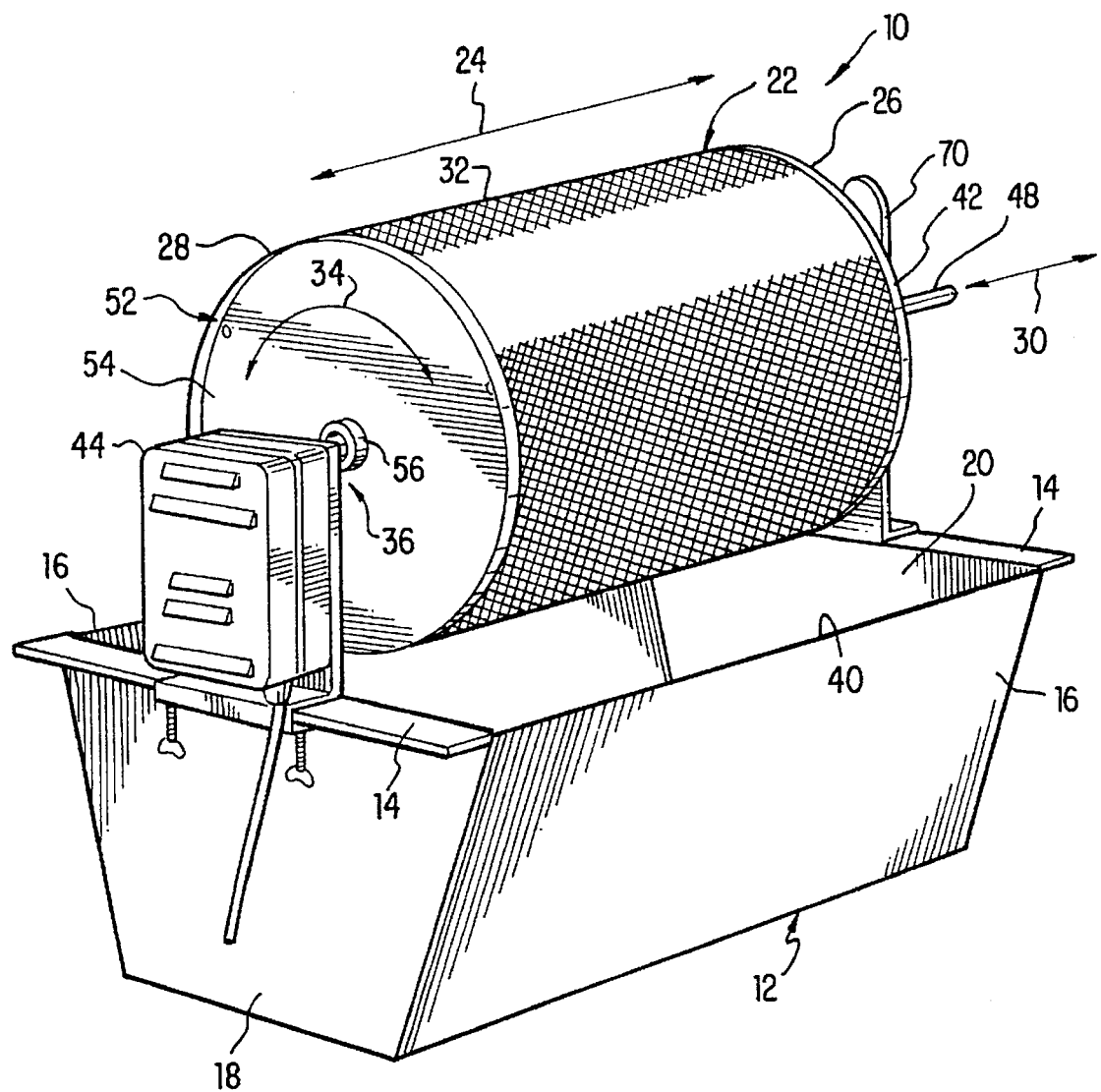
FIG. 1 is a perspective view of the preferred embodiment of the present invention supported over a barbecue grill.
Figure 2:
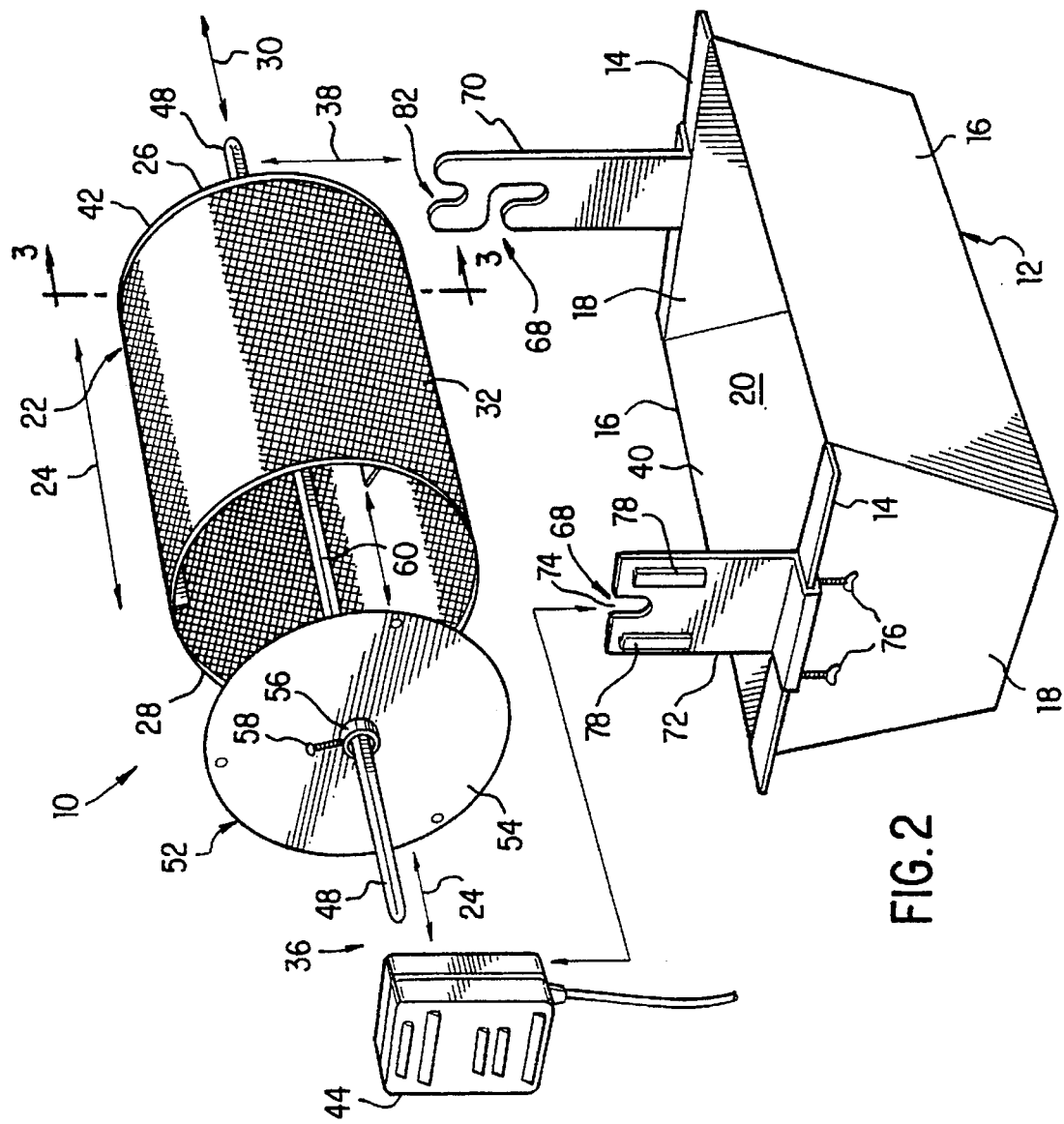
FIG. 2 is an exploded perspective view of the preferred embodiment of the present invention.
Figure 3:
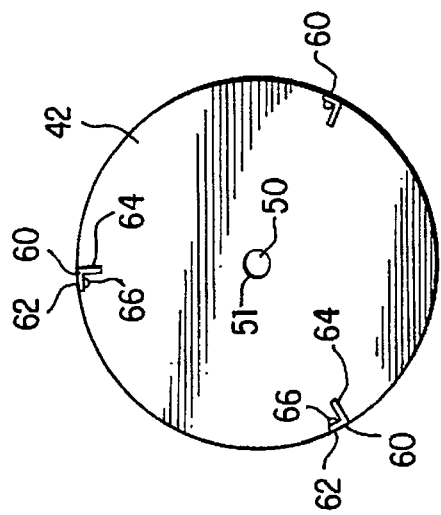
FIG. 3 is a cross-sectional view of the preferred embodiment of the housing of the present invention, taken along the Line 3—3 of FIG. 2; and, FIG. 4 is a elevational view of the rear side of a rotational motor mechanism employed in a preferred embodiment of the present invention.

Referring now to FIGS. 1–3, there is shown bean roasting system 10 mounted over barbecue grill 12 and constructed to provide rotational displacement of housing 22 with respect to barbecue grill 12 for purposes of heating and roasting beans contained within roasting system 10. In overall concept, barbecue grill 12 is schematically shown as being a kettle type housing where coals or gas driven burners may reside for purposes of providing heat to bean roasting system 10. Barbecue grill 12 may be one of a number of commercially available types of barbecue units currently on the market and preferably includes a pair of opposing barbecue rim members 14 which as will be seen in following paragraphs, aids bean roasting system 10 to be mounted to barbecue grill or unit 12 in an expeditious manner.

In overall concept, bean roasting system 10 is generally applicable for domestic use with barbecue units or grills 12 used by households. In recent years, a growing percentage of the population has become interested in specialty coffees and a growing percentage of the population roasts its coffee beans for household consumption. In this manner, different variations of coffee beans may be mixed together relatively small quantities in order that the household is provided with specialty coffee flavors highly developed to the particular taste of the individual roasting the coffee beans. Bean roasting system 10 has been developed to allow the average household to roast its own coffee beans in a small quantity responsive to individual tastes.

With respect to barbecue grill or unit 12, such is not important to the inventive concept as is herein described, with the exception that such provide a container wherein coals are maintained or alternatively gas burners are provided to provide the proper temperature for roasting the beans contained within bean roasting system 10. Barbecue unit or grill 12 may include a pair of opposing sidewalls 16 and opposing end walls 18 defining barbecue chamber 20 within which the heating elements or coals may be maintained.

Bean roasting system 10 includes housing member 22 which extends in longitudinal direction 24 as is seen in FIGS. 1 and 2. Housing member 22 includes first end section 26 and second end section 28 longitudinally displaced each from the other, as is seen in the Figures. Housing member 22 is Generally formed as a cylindrical tubular member in overall contour which is adapted to be rotated about longitudinal axis 30. Of importance is the fact that housing sidewall 32 be formed of a metallic composition such as aluminum or steel and is further formed in a mesh-like construction or has a plurality of openings formed therethrough which will allow convective heat to pass within housing member 22 while maintaining and capturing the coffee beans within the interior of housing member 22. The particular metallic composition of sidewall 32 is not important to the inventive concept as herein described, with the exception that such be formed of a metal which will not deform under the convective heat transport applied from the coals or heating elements contained within barbecue grill or unit 12.

Housing member 22, as has been stated, is adapted for rotation about longitudinal axis 30 in a direction shown by arcuate directional arrow 34 in FIG. 1. In general, rotation of housing member 22 about longitudinal axis 30 is at a low speed which may approximate 2-10 revolutions per minute and in general corresponds to the normal rotational speed of a standard spit used for cooking foods over barbecue units 12.

Bean roasting system 10 further includes rotational mechanism 36 for rotating housing member 22 about longitudinal axis 30. Rotational mechanism 36, as will be seen in following paragraphs, is coupled to housing member 22 and is positionally located in fixed displacement in vertical direction 38 with respect to barbecue grill upper section 40. In this manner, it is seen from FIG. 1 that rotational mechanism 36 and housing member 22 are mounted in the path of convective heating applied to beans contained within housing member 22 from coals or other heating type elements maintained within barbecue chamber 20. As has been stated, housing sidewall 32 being formed as a tubular member includes a mesh-like screen make-up or may be formed of a sheet metal having openings formed therethrough.

Housing member 22 having first housing end section 26 includes first end plate member 42 which is fixedly coupled to first housing end section 26 by welding, bolts, or some like means not important to the inventive concept as is herein described. In this manner, first end plate member 42 in combination with housing sidewall 32, forms an open chamber for containing beans to be roasted therein. Additionally, first end plate member 42 may be formed of a metal composition such as stainless steel or some other like composition structurally sufficient to maintain the loads applied thereto and accept the convective heat transport from the coals or other heating elements within barbecue unit 12. Additionally, although not shown, first end plate member 42 may be formed of a mesh-like screen or of a sheet metal having openings much in the same manner as sidewall member 32 of housing member 22.

Figure 4:
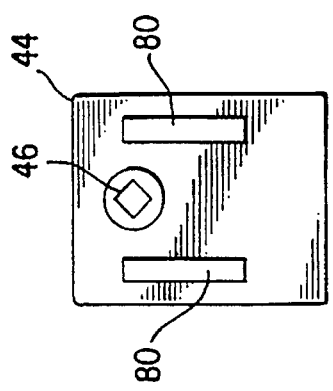

Rotational mechanism 36 includes motor mechanism 44 which can be a commercially available rotisserie motor operating from a standard 120-volt AC line. Motor mechanisms 44 are commercially available and are adapted for low speed rotation of drum or housing member 22 about longitudinal axis 30. Motor mechanism 44, as is seen in FIG. 4, includes motor mechanism opening 46 which is generally non-circular in contour and is adapted for insert of axially directed rod 48 which in the abstract serves as a motor shaft. The external contour of axially directed rod 48 is in conformance with the contour of motor mechanism opening 46 to allow axially directed rod 48 to be rotationally driven responsive to the actuation of motor mechanism 44.

Axially directed rod 48 extends through housing member 22 in longitudinal direction 24 and extends through first end plate member 42 for mounting to bracket members to be described in following paragraphs. Axially directed rod 48 extends through plate opening 50, as is seen in FIG. 3. Axially directed rod 48 may be fixedly coupled to first end plate 42 by welding, bolting, or some like means not important to the inventive concept as herein described. Coupling of rod 48 by welding at periphery 51 of opening 50 provides a fixed coupling which allows rotational displacement of plate 42 and housing 22 responsive to rotation of rod 48. Alternatively, end plate 42 may be bolted to or otherwise fixedly attached to rod 48 and housing 22. In this manner, axially directed rod 48 is rotationally coupled to motor mechanism 44 and allows rotation of drum or housing member 22.

Bean roasting system 10 further includes removable closure mechanism 52 which is releasably coupled to second housing end section 28 for capturing beans within perforated drum or housing member 22 when drum 22 is rotatively displaced about longitudinal axis 30. Removable closure mechanism 52 includes second end plate member 54 which may be formed of a metal composition such as steel or some like metal in similar manner to first end plate member 42 previously discussed. Second end plate member 54 includes flange 56 passing around axially directed rod 48, as is clearly seen in FIG. 2 and FIG. 1. Set screw 58 shown in FIG. 2 threadedly engages plate flange 56 and is adapted to contact an outer surface of axially directed rod 48. In this manner, second plate member 54 may be fixedly secured to axially directed rod 48. Additionally, second end plate member 54 may be fixedly secured to second housing end section 28 through bolts or other like mechanisms, not important to the inventive concept as is herein described. Second end plate member 54 upon being rotated through coupling of set screw 58 and plate flange 56 provides for rotation of perforated drum or housing 22 about longitudinal axis 30.

Additionally, when it is desired to remove second end plate member 54 from contact with second housing end section 28, set screw 58 may be unthreaded to allow longitudinal displacement of second end plate member 54 on axially directed rod 48.

Bean roasting system 10 further includes a mechanism for agitating beans captured or being maintained within perforated drum or housing member 22. Agitation is provided by a plurality of agitation flange members 60 which extend in longitudinal direction 24 and are generally L-shaped in cross-sectional contour, as is seen in FIG. 3. Agitation flange members 60 include a flange base 62 mounted adjacent an inner surface of sidewall member 32 and is fixedly secured by welding or threaded members such as screws 66, as is seen in FIG. 3. Agitation flange members 60 further include agitation flange walls 64 which extend in a somewhat radial direction with respect to longitudinal axis 30. In this manner, beans are forced over flange walls 64 within perforated drum or housing member 22 and are agitated as housing member 22 is rotated about longitudinal axis 30 in direction 34. Beans are carried in an arcuate direction and when reaching a critical point, are displaced over agitation flange walls 64 to provide a constant motion and differing surface areas of the beans to the convective transport of heat from the coals or other heating elements maintained within barbecue grill chamber 20. As seen in FIG. 3, longitudinally directed agitation flange member 60 may be mounted to the inner wall of perforated drum 22 in a somewhat equidistant displacement each with respect to the other.

Bean roasting system 10 further includes housing mounting mechanism 68, releasably coupled to barbecue rim members 14 of barbecue grill or barbecue unit 12 and to rotational mechanism 36 for positionally located drum or housing member 22 in fixed displacement with respect to vertical direction 38 of barbecue grill 12.

Housing mounting mechanism 68 includes first bracket member 70 and second bracket member 72 mounted to respective rim members 14 as is shown and are adapted to rotatively support housing or perforated drum 22 above barbecue grill 16. Second bracket member 72 includes second recess 74 which is generally arcuate in contour and is adapted to have a section of axially directed rod 48 extending therethrough. Rod 48 may rotate about longitudinal axis 30 within recess 74 of second bracket member 72. Additionally, second bracket member 72 has associated therewith a plurality of bracket set screws 76 which may be used to releasably mount second bracket member 72 to a respective rim member 14. Additionally, second bracket member 72 includes a pair of bracket ear members 78 wherein lug elements 80 formed on a rear surface of motor mechanism 44 may be inserted. In this manner, motor mechanism 44 may be mounted to second bracket member 72 in a releasably fixed manner while allowing axial rod 48 to be rotatively displaced about longitudinal axis 30.

Housing mounting mechanism 68 further includes first bracket member 70 which may be mounted to rim member 14 in a similar fashion as has been discussed for second bracket member 72. First bracket member 70 includes first recess 82 which is formed within a wall of first bracket member 70 to allow mounting of one end of axially directed rod 48, as is shown.

In this manner, motor mechanism 44 may he mounted to second bracket member 72 and first bracket member 70 while simultaneously allowing rotation of axially directed rod 48 and perforated drum 22. Beans to he roasted or otherwise heated are inserted within perforated drum 22 and second end plate 54 is slidingly displaced on axial rod 48 against second housing end section 28 in order to provide a closed chamber containing beans to be roasted. Set screw 58 or other like mechanism is actuated to couple second end plate member 54 to axially directed rod 48. Motor mechanism 44 engages axial rod 48 and axial rod 48 and motor mechanism 44 are mounted on second bracket member 72 as well as first bracket member 70. Actuation of motor mechanism 44 responsively causes rotation of axial rod 48 and responsive axial rotation of perforated drum or housing member 22 to allow an even heat distribution on beans contained therein.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases, particular locations of elements may be reversed or interposed, all without departing from the spirit or the scope of the invention as defined in the appended claims.

What is claimed is:

1. A coffee bean roasting system for adapting a barbecue grill for roasting coffee beans, comprising:

(a) a housing extending in a longitudinal direction, said housing having opposing longitudinally displaced first and second ends;

(b) means for rotating said housing about a longitudinal axis, said means for rotating said housing being coupled to said housing and positionally located adjacent an upper section of the barbecue grill, said means for rotating said housing including (1) a rod member extending longitudinally through said housing and secured thereto for rotation therewith, said rod member having opposing first and second ends extending longitudinally beyond respective first and second ends of said housing (2) a motor driving coupled to said first end of said rod member, and (3) a pair of mounting brackets releasably coupled to the barbecue grill, a first of said pair of mounting brackets having a recess formed therein for rotatively supporting said second end of said rod member, a second of said pair of brackets being adapted for releasable securement of said motor thereto; and, (c) removable closure means releasably coupled to said second end of said housing for capturing the coffee beans within said housing when said housing is rotatively displaced about said longitudinal axis.

2. The coffee bean roasting system as recited in claim 1 further comprising means disposed within said housing for agitating the coffee beans captured in said housing.

3. The coffee bean roasting system as recited in claim 2 wherein said means for agitating includes a flanged agitation member fixedly secured to an inner wall of said housing.

4. The coffee bean roasting system as recited in claim 3 wherein said flanged agitation member extends in said longitudinal direction.

5. The coffee bean roasting system as recited in claim 2 wherein said means for agitating includes a plurality of flanged agitation members secured to an inner wall of said housing, said plurality of flanged agitation members being spaced substantially equidistant each from the other.

6. The coffee bean roasting system as recited in claim 1 wherein said housing comprises an open ended tubular member, said first end of said housing being open.

7. The coffee bean roasting system as recited in claim 6 wherein said tubular member is formed of a mesh-like screen.

8. The coffee bean roasting system as recited in claim 6 wherein said tubular member is formed of sheet metal having a multiplicity of openings formed therethrough.

9. The coffee bean roasting system as recited in claim 1 wherein said removable closure means includes a plate member releasably secured to said rod member for rotation with said housing.

10. The coffee bean roasting system as recited in claim 9 wherein said plate member is secured to said rod member by a set-screw member.

\* \* \* \* \*